O. PLETSCHER.
ELECTRIC MACHINE.
APPLICATION FILED APR. 14, 1917.
1,393,395. Patented Oct. 11, 1921.
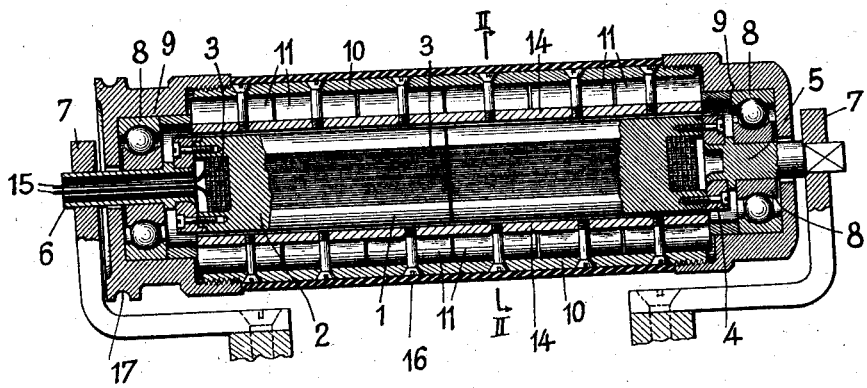
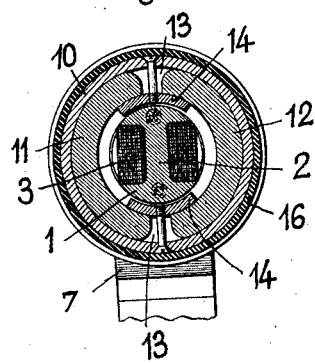
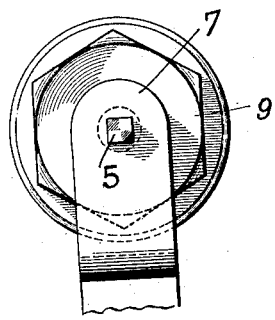
Inventor:
Otto Pletscher,
By Henry Orth
Atty

UNITED STATES PATENT OFFICE.

OTTO PLETSCHER, OF ALBISRIEDEN, SWITZERLAND.

ELECTRIC MACHINE.

1,393,395.

Specification of Letters Patent.  Patented Oct. 11, 1921.

Application filed April 14, 1917. Serial No. 162,147.

*To all whom it may concern:*

Be it known that I, OTTO PLETSCHER, a citizen of the Republic of Switzerland, residing at Albisrieden, Canton of Zürich, Switzerland, have invented certain new and useful Improvements in Electric Machines, (for which I have filed an application in Switzerland, No. G85,905, April 5, 1916;) and I do hereby declare the following to be a full, clear, and exact description of the invention, such as will enable others skilled in the art to which it appertains to make and use the same, reference being had to the accompanying drawing, and to letters or figures of reference marked thereon, which form a part of this specification.

This invention has for its object the production of an electric machine of a very compact construction, so that it can be made of an exceedingly small size, it being able to generate, owing to its compactness, a current of a determinate strength. According to this invention, I am thus able to manufacture, for instance, electric machines of a size adapted to be conveniently carried and operated by hand and yet able to generate a current for the production of a light in electric pocket lamps. The machines according to this invention are also adapted to generate a current for the production of a light in electric lamps placed upon bicycles, motor cars or the like, or they may be used in an ignition apparatus for internal combustion engines, or in connection with electric telephony or telegraphy.

The great difficulty to be overcome in the production of such electric machines, particularly when they are of a very small size, lies in the provision of a sufficiently strong magnetic field by means of permanent magnets.

This difficulty is now overcome in my improved construction which comprises, briefly stated, a field-magnet having the shape of a closed, hollow cylinder inclosing the armature and composed of pairs of semi-circular permanent magnets arranged side by side in the longitudinal direction of the cylinder, the opposite magnetic poles of the same sign of each pair separated by a gap being connected by suitable means, for instance a pole-piece or the like. A revolving movement may be imparted thereby either to the armature or the field magnets. Such a type of magneto-electric machine is generally known. But in making such machines very small, the small magnets and other parts used are unsuitable for obtaining strong currents, such as for ignition purposes and the like.

I have overcome this difficulty by making the gap between the half-ring magnets not greater than the thickness of the magnets, and placing a pole piece in direct contact with and overlapping the adjacent ends of the magnet, said pole piece being of lesser thickness than the width of the gap at its narrowest part, preferably adjacent the pole piece.

The invention consists also in certain features of construction and combination of parts, all of which will be fully set forth hereinafter and particularly pointed out in the claims.

The invention will now be more particularly described with reference to the accompanying drawing, which illustrates a constructional example of the invention.

In this drawing:

Figure 1 is a longitudinal cross-section of this embodiment.

Fig. 2 is a cross-section on the line II—II of Fig. 1 and

Fig. 3 is a side view of this embodiment.

In carrying the invention into effect as shown on the drawing I provide a two-pole armature 1 having a rib 2 connecting its two pole-shoes. 3 denotes a winding wound around the rib 2. The armature 1 is fixed between two plates 4, the one of which is fixed to a shaft 5 while the other one is fixed to a hollow shaft 6. The shafts 5 and 6 are supported in stationary brackets 7 preventing a rotation of these shafts and therefore also of the armature 1. Each shaft 5 and 6, respectively, carries a ball-bearing 8 surrounded by a box-like ring 9. The ring 9 on the left hand side has a peripheral groove 17 adapted to receive any suitable driving means. A cylinder of brass 10 arranged between the two rings 9 and preventing a magnetic leakage or dispersion is fixed to said rings 9. Cylinder 10 carries six pairs of semi-circular permanent magnets 11, 12, which are not made of a special steel but of ordinary steel. A small gap is provided between adjoining pairs of such magnets.

As shown in Fig. 2, also the poles of the two magnets 11, 12 of each pair do not touch each other as I provide a gap 13 between the two opposite magnetic poles of the same sign. Two pole-shoes 14 are provided on the inner side of the semi-circular magnets 11, 12 of each pair inclosing together a circular space. Said shoes 14 connect the poles of the same sign of each pair of magnets and they are fixed to the cylinder 10. The stationary armature 1 is arranged between these pole-shoes 14 between which the lines of force flow along a straight line. No magnetic dispersion takes place between the shoes 14, so that a field of great density is formed. The ends of the wire 15 wound around the armature 1 pass through the hollow shaft 6. Any suitable device, for instance an electric lamp or the like, may be connected in a well known manner to the ends of the wire 15. The brass cylinder 10 is surrounded by a covering 16 which may be made, for instance, of leather.

As already stated, the rings 9 together with cylinder 10 and the permanent magnets 11, 12 and the pole-shoes 14 may be moved relatively to the stationary armature 1 by means of any suitable driving member coöperating with recess 17. In the embodiment shown a current is generated in the armature 1 as soon as the permanent magnets 11, 12 are rotated at a speed of about 1400 revolutions.

What I claim is:

1. In a magneto-electric machine, arcuate permanent field magnets, spaced apart to form a gap that increases in width toward the outer periphery of said magnets and a pole shoe connecting poles of like sign on opposite sides of said gap.

2. In a magneto-electric machine arcuate permanent field magnets, spaced apart to form a gap that increases in width toward the outer periphery of said magnets, and a pole shoe connecting poles of like sign on opposite sides of said gap and of a thickness less than the minimum distance between the poles.

3. A magneto-electric machine having spaced, arcuate field magnets, and pole pieces connecting the ends of said magnets and spanning the space between said magnets; in combination with a non-magnetic casing and means passing through the gap connecting said casing and pole pieces and holding the latter in contact with said magnets.

4. In a magneto-electric machine, arcuate permanent field magnets spaced apart to form a gap that increases in width toward the outer periphery of said magnets and a pole shoe connecting poles of like sign on opposite sides of said gap, and said gap having its least dimension at the shoe.

5. An electric machine comprising a field magnet having the shape of a closed, hollow cylinder and composed of pairs of semi-circular permanent magnets arranged side by side in the longitudinal direction of the cylinder, the opposite magnetic poles of the same sign of each pair of magnets being separated by a gap increasing in width toward the periphery of said magnets, pole shoes fixed within the cylinder and connecting the opposed magnetic poles of the same sign of the magnets of a pair, two box-like rings, each fixed to an end of said cylinder, one of said rings arranged to coöperate with means for rotating said cylinder, an armature inclosed by said cylinder and having two pole-shoes common to all the magnets and a rib connecting the armature pole-shoes, the width of which shoes corresponds to that of the pole shoes of the magnets, a hollow and a solid winding on this rib, a hollow and a solid shaft, one of said shafts being arranged on one side and the other on the opposite side of said cylinder, plates rigidly connecting these shafts to the armature, and stationary bearings for said shafts preventing a rotation of the latter, the ends of said winding passing through the hollow shaft.

6. In a magneto-electric machine, field elements arranged side by side, each element composed of substantially semi-circular magnets having a gap between them widening toward their outer peripheries, and pole shoes common to all the magnets connecting the opposed poles of like sign of said magnets, said pole shoes of less thickness than the minimum width of said gaps.

In testimony that I claim the foregoing as my invention, I have signed my name.

OTTO PLETSCHER.